(12) United States Patent
Scelfo (10) Patent No.: US 8,882,076 B2
(45) Date of Patent: Nov. 11, 2014

(54) METHOD AND APPARATUS FOR ROTATING ARTICLES ON A PALLET

(75) Inventor: David Scelfo, Point Pleasant Beach, NJ (US)

(73) Assignee: Unex Manufacturing, Inc., Jackson, NJ (US)

( * ) Notice: Subject to any disclaimer, the term of this patent is extended or adjusted under 35 U.S.C. 154(b) by 926 days.

(21) Appl. No.: 12/889,125

(22) Filed: Sep. 23, 2010

(65) Prior Publication Data

US 2011/0070061 A1    Mar. 24, 2011

Related U.S. Application Data

(60) Provisional application No. 61/244,966, filed on Sep. 23, 2009.

(51) Int. Cl.
*A47G 29/00* (2006.01)
*F16M 11/00* (2006.01)
*B65D 19/38* (2006.01)

(52) U.S. Cl.
CPC ...... *B65D 19/38* (2013.01); *B65D 2519/00273* (2013.01); *B65D 2519/00318* (2013.01); *B65D 2519/00288* (2013.01); *B65D 2519/00343* (2013.01); *B65D 2519/00805* (2013.01)
USPC ............ 248/694; 211/164; 414/781; 414/816

(58) Field of Classification Search
CPC .................... B65D 19/38; B65D 2519/00273; B65D 2519/00318; B65D 2519/00805; B65D 2519/0028; B65D 2519/00343
USPC ......... 248/349.1, 694; 211/164; 414/781, 816
See application file for complete search history.

(56) References Cited

U.S. PATENT DOCUMENTS

| | | | | |
|---|---|---|---|---|
| 2,468,055 A * | 4/1949 | Gibler | ............... | 414/528 |
| 2,899,093 A * | 8/1959 | Morrell | ............... | 414/639 |
| 3,217,965 A * | 11/1965 | Macie | ............... | 206/600 |
| 4,922,834 A * | 5/1990 | Kraus | ............... | 108/57.13 |
| 5,370,247 A * | 12/1994 | Handleman | ............... | 211/164 |
| 6,004,091 A * | 12/1999 | Roth | ............... | 414/263 |
| 2004/0126218 A1* | 7/2004 | Padovani | ............... | 414/788.3 |
| 2009/0129902 A1* | 5/2009 | Schafer | ............... | 414/274 |

* cited by examiner

*Primary Examiner* — Anita M King
(74) *Attorney, Agent, or Firm* — Hoffmann & Baron, LLP (57) ABSTRACT

An apparatus and method for rotating articles stored on a pallet without rotating the entire pallet. The turntable of the present invention is located on the pallet or integrated into the top surface of the pallet. By rotating the pallet within the rack, the articles thereon may be loaded and unloaded from a position directly in front of the picker.

8 Claims, 12 Drawing Sheets

METHOD AND APPARATUS FOR ROTATING ARTICLES ON A PALLET

CROSS-REFERENCE

The present application claims priority from provisional U.S. Patent Application No. 61/244,966, filed on Sep. 23, 2009, entitled "Method and Apparatus for Rotating Articles on a Pallet", David Scelfo inventor, which is incorporated herein by reference in its entirety.

BACKGROUND OF THE INVENTION

1. Field of the Invention

The present invention relates to a method and apparatus for rotating articles, including products, supported by a pallet.

2. Description of the Prior Art

Pallets are used in transporting and storing articles. When articles are stored on the pallet in racks, there are many difficulties for pickers inherent in picking articles not directly in front of them at the point of pick, for example, toward the back of the pallet and the rack. These difficulties include pickers experiencing significant stress to the shoulders and upper back when picking the hard to reach articles by having to bend over, reach a great distance and/or pull out layers of articles. Many prior art methods for addressing these concerns did so by providing additional space about the top and/or sides of the pallet and articles and/or by providing access to same from additional and/or all sides. These prior art solutions, come with a significant cost, in that they generally reduce warehouse storage density and may require that existing racks be redesigned.

BRIEF SUMMARY OF THE INVENTION

The apparatus and the method of the present invention allows for articles, stacked on the apparatus, which is mounted on a pallet, to be rotated and in this manner assists the picker in picking/removing articles from portions of the pallet not directly in front of the picker, by enabling the articles supported by the apparatus to be rotated within the rack, and elsewhere, so that the articles for picking/removal are now in a better position for picking and/or loading. The present invention is positioned on the pallet, secured or unsecured, or integrated with and into the article bearing surface of the pallet.

The apparatus and method of the present invention allows for articles, for example, boxes supported on a pallet to be rotated in order to aid in picking/removing boxes from the pallet while either on the floor or when installed into pallet rack or elsewhere. In one preferred embodiment it comprises a pallet cover, a turntable bearing, and a platform or flat surface on which to stack the articles. The platform can be secured to prevent it from moving when in position or when moved.

The present invention is distinguished in several ways from the turntables of the prior art used in connection with the unloading and loading of articles on a pallet. The most significant being that the apparatus of the present invention is positioned generally on top of, or it may constitute the top of the pallet, in which case the top of the pallet is the surface of the pallet upon which articles are placed, and the apparatus is positioned below the articles to be transported/stored/picked/loaded. The prior art teaches that the turntables and the like are to be positioned beneath the pallet, in which case the entire pallet rests upon the turntable and the entire pallet rotates along with the articles resting thereon; thereby requiring that the space in which the pallet resides be big enough to allow the pallet and its contents to rotate.

Some of the advantages of picking off the apparatus of the present invention when compared to picking off a static pallet are: safety, a greatly reduced reach results in better ergonomics and picking positions off the ground no longer require climbing into the rack; storage density, the entire surface can be used to store articles, as there is no need to leave space between the articles or above the articles for picker access, rack beam levels can be closer together because additional clearance is no longer needed between levels for reaching in; and labor costs, as it is easier to reach articles, the articles are picked more efficiently resulting in more picks in less time. The present also facilitates storage of multiple products supported by one pallet.

Embodiments of the present invention may be positioned on a pallet on the floor and used to create an ergonomic advantage for a person picking boxed from a specific position and/or positioned in an elevated pallet rack location that will be picked with assistance from either a fork truck, order picker, or similar type device.

Embodiments of the apparatus and method of the present invention may be used: on pallets located in pallet rack, still accessible by a worker on the floor, to reduce reaching; when loading pallets in the reverse order which grants both time savings and ergonomic benefits; to store multiple products in one pallet position; and/or in industrial environments such as alongside assembly lines to aid in ergonomics.

BRIEF DESCRIPTION OF THE SEVERAL VIEWS OF THE DRAWING

In order that the present invention may be more fully understood, it is described in the accompanying figures, but only by way of example and without limiting the broad scope or various other embodiments of the present invention.

DETAILED DESCRIPTION OF THE INVENTION

The apparatus and method of the present invention provides for rotation of articles and supporting platform preferably in 90 degree or 180 degree increments, however, other embodiments provide for almost any amount of rotation from 0 degrees to 360 degrees, or more. Preferably, the apparatus may be provided with a mechanism to rotationally lock it in place after the desired rotation.

In one preferred embodiment, the apparatus comprises a turntable or other rotating means, affixed to a pallet and a platform or flat surface on which to stack the articles. In another preferred embodiment, the apparatus is integrated into the pallet. In still another preferred embodiment, the apparatus, comprises a turntable, separate from the pallet, but positioned on the load bearing side of the pallet. In this case, the apparatus may be permanently or temporarily secured to the load bearing face of the pallet, or may merely be placed upon said pallet face. Thus, after the combination of pallet, apparatus and articles are placed in pallet racks, the present invention allows for the articles to rotate while remaining in the pallet rack and thus provide for easier access to said articles for ergonomic and efficient picking.

While rotating the platform and/or articles of some embodiments of the present invention may require additional clearance as the turntable portion swings through its arc, this is addressed in some embodiments simply by reducing the size of the turntable to increase clearance based on beam dimensions.

Figure 1:
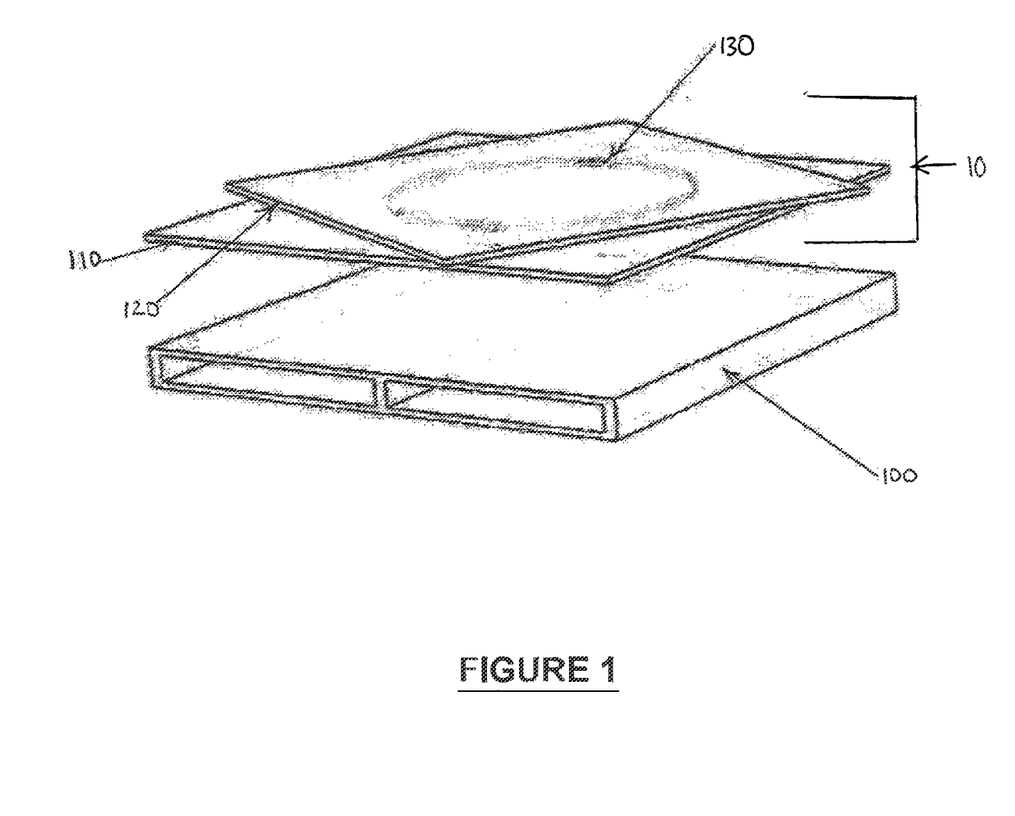
FIG. 1 is an illustrative drawing of one embodiment of the apparatus of the present invention and a pallet.
Figure 2:
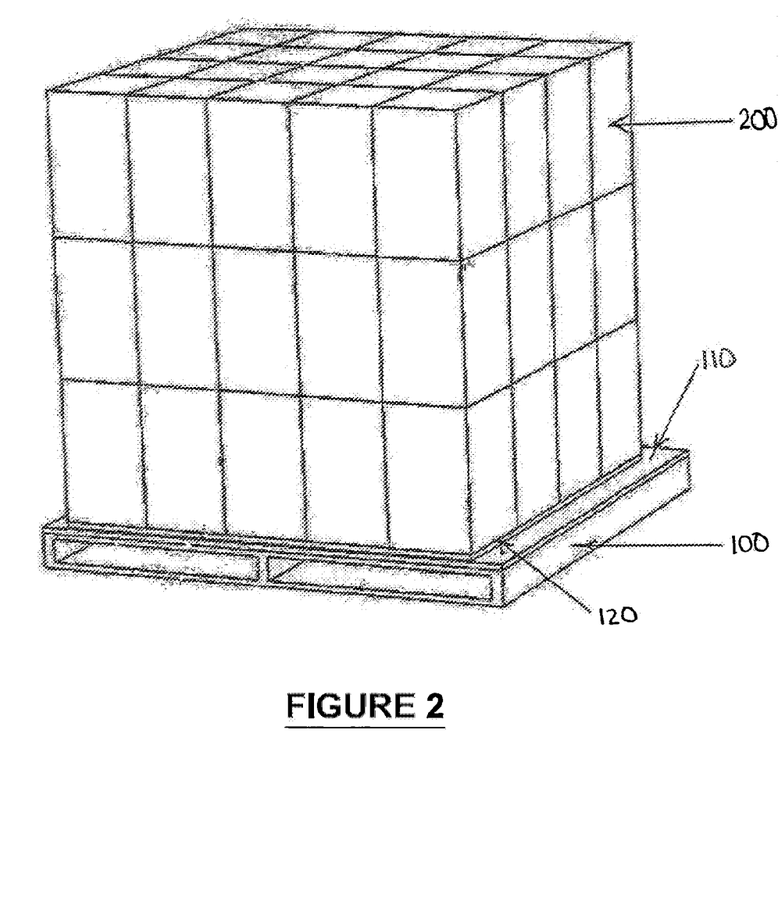
FIG. 2 is an illustrative drawing of one embodiment of the present invention showing the apparatus positioned on the pallet, the apparatus loaded with boxes.

FIG. 1 shows one preferred embodiment of the present invention, in this embodiment the apparatus is comprised the pallet cover (110) mounted on the pallet (100), the turntable bearing (130) mounted on the pallet cover, and the turntable cover (120). FIG. 2 shows the articles or boxes (200) three high, four deep and five across positioned on the turntable cover (120).

Figure 3:
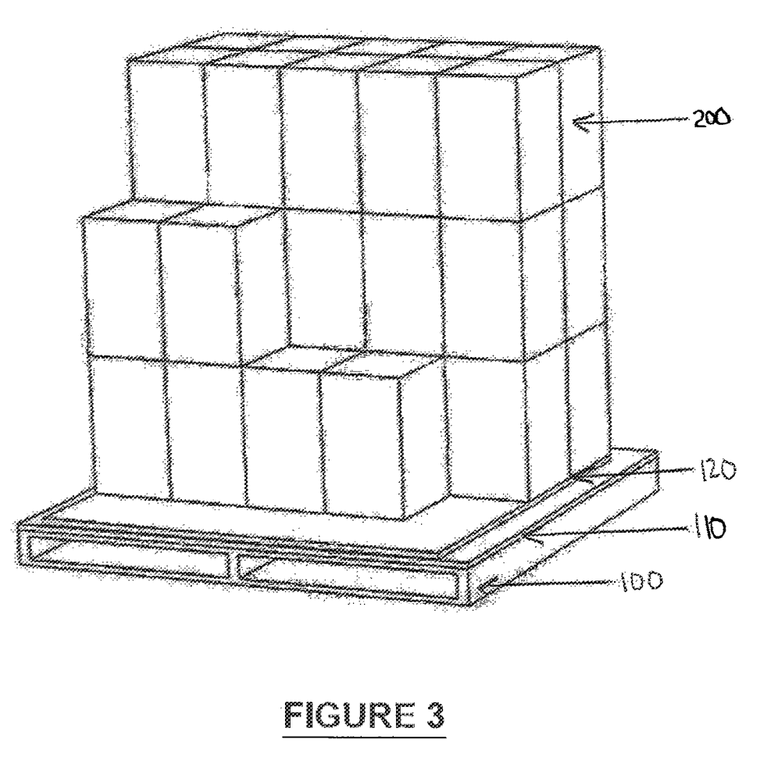
FIG. 3 is an illustrative drawing of one embodiment of the present invention showing the pallet and apparatus after the first few boxes are picked.
Figure 4:
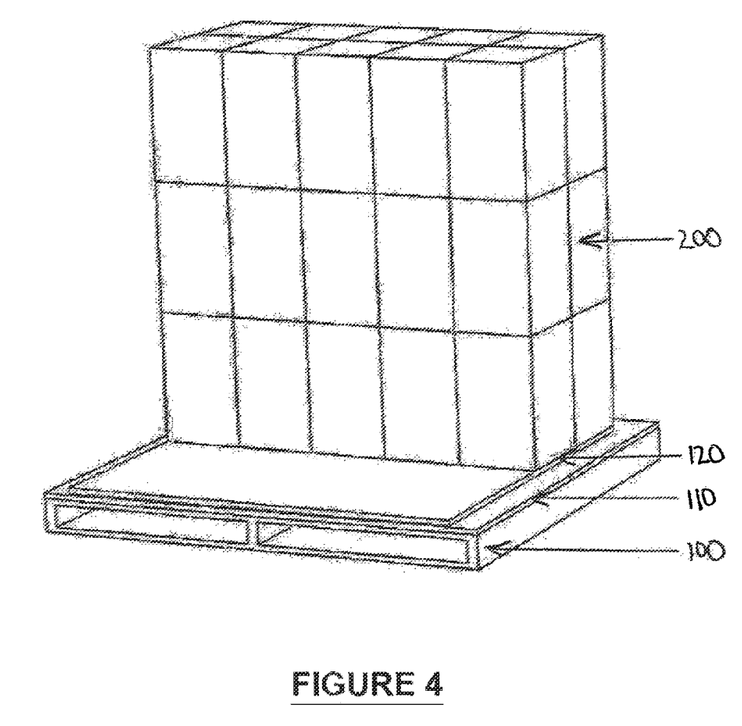
FIG. 4 is an illustrative drawing of one embodiment of the present invention showing the pallet and apparatus after half the boxes are picked.
Figure 5:
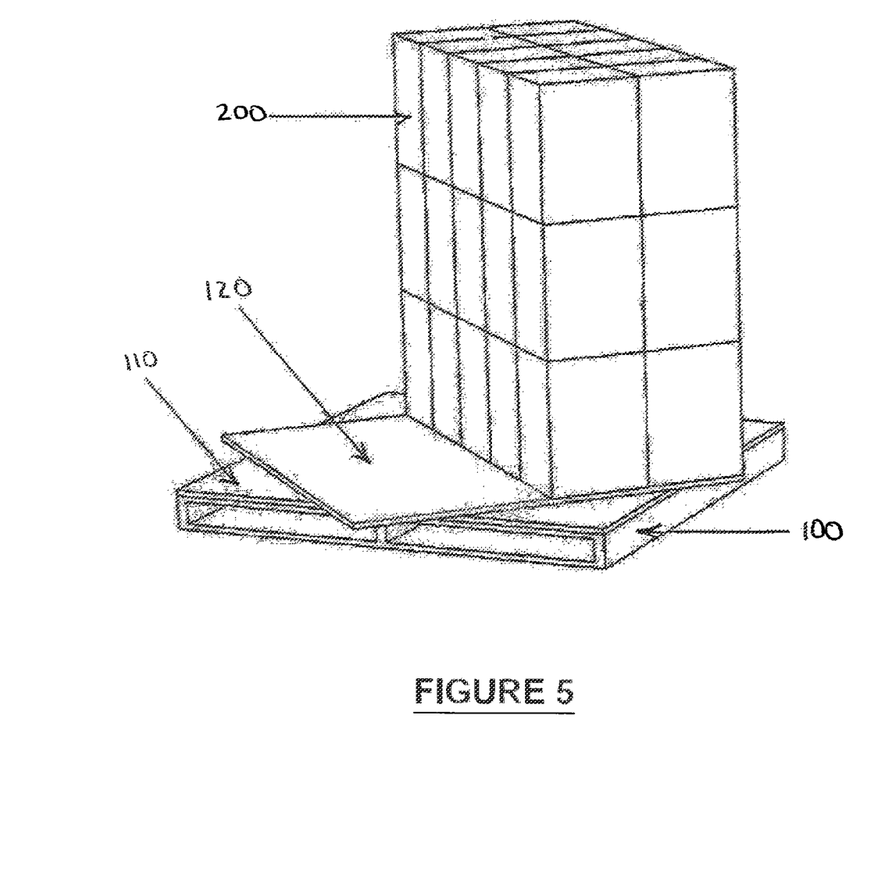
FIG. 5 is an illustrative drawing of one embodiment of the present invention showing the apparatus after its top part has been rotated approximately 45 degrees.
Figure 6:
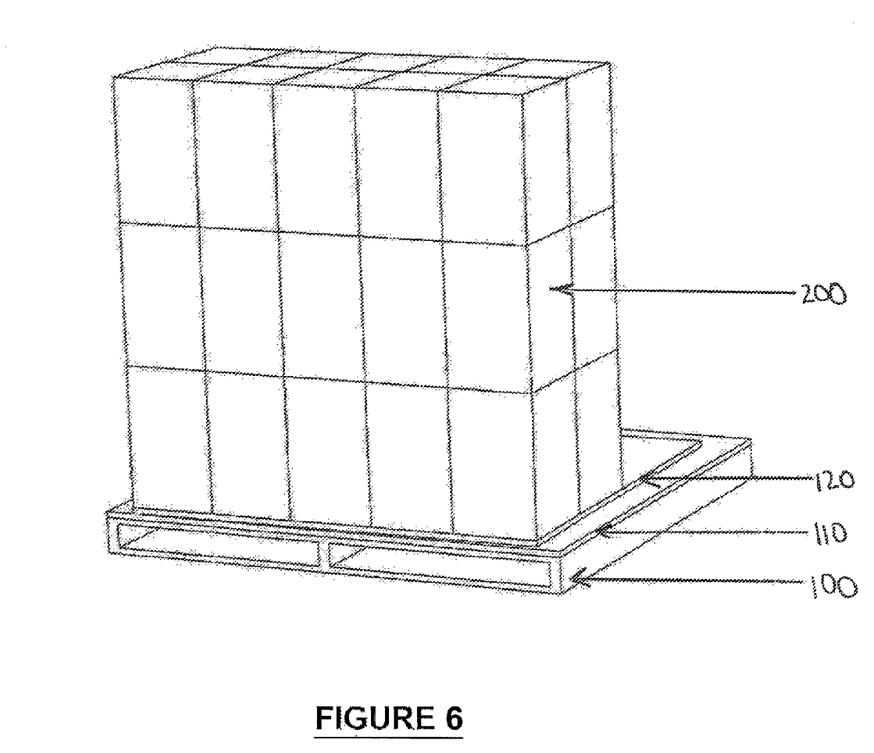
FIG. 6 is an illustrative drawing of one embodiment of the present invention showing the apparatus after its top part has been rotated 180 degrees and is ready for continued picking.
Figure 7:
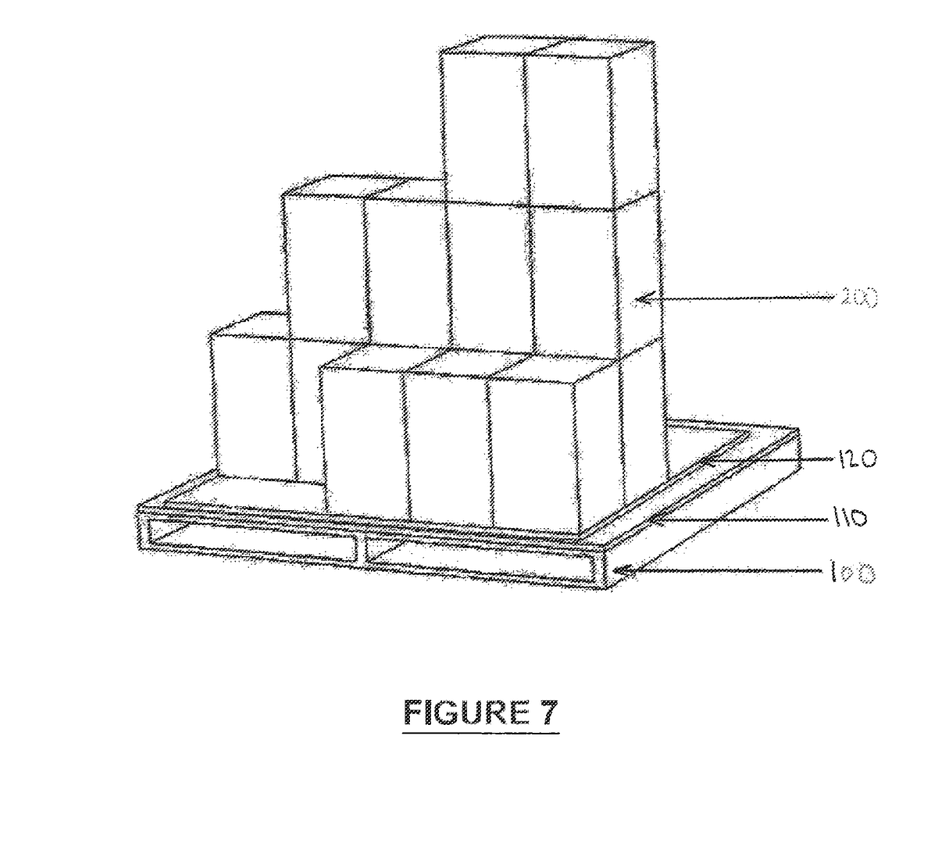
FIG. 7 is an illustrative drawing of one embodiment of the present invention showing the apparatus after it has been rotated 180 degrees and after some additional picking.

FIG. 3 shows the pallet and apparatus after the first few boxes are picked. FIG. 4 shows the pallet and apparatus after half the boxes are picked. FIG. 5 shows the apparatus after its top part bearing the boxes has been rotated approximately 45 degrees. FIG. 6 shows the apparatus after its top part (in this case the turntable cover 120) has been rotated 180 degrees and is ready for continued picking FIG. 7 shows the pallet and apparatus after some additional picking, which has occurred after the 180 degrees rotation of the apparatus and boxes shown in FIG. 6.

While the preferred embodiment above is disclosed in connection with picking or removing boxes or articles from a pallet, the present invention also provides for the loading of articles or boxes in a similar manner.

Figure 8A:
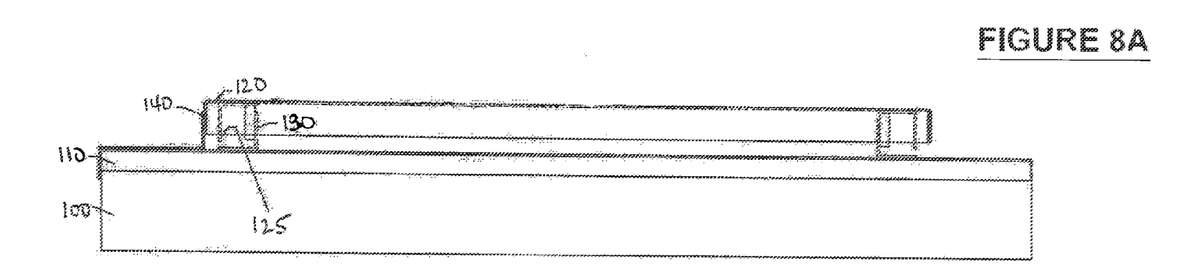
FIG. 8 is an illustrative drawing one embodiment of the present invention showing one embodiment of the hinged stop or detent of the apparatus, which is used to stop the apparatus from rotating, the indent is shown in the locked position (8A), an immediate position (8B) and the locked position (8C).
Figure 8B:
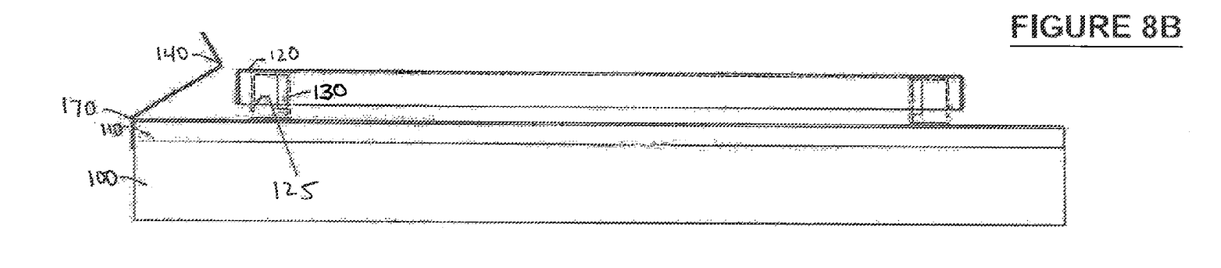
Figure 8C:
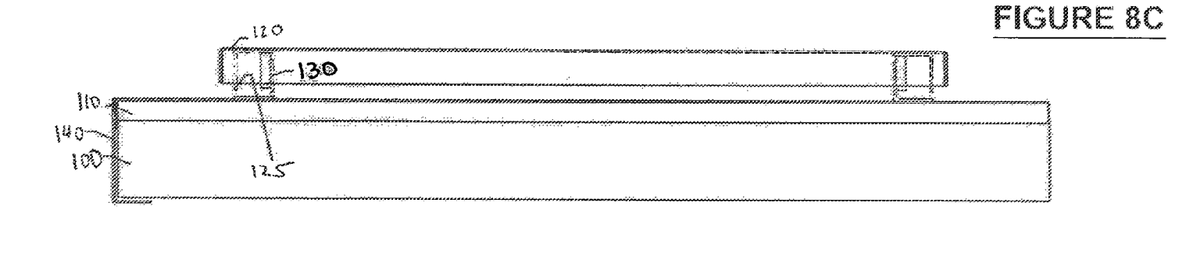
Figure 9:
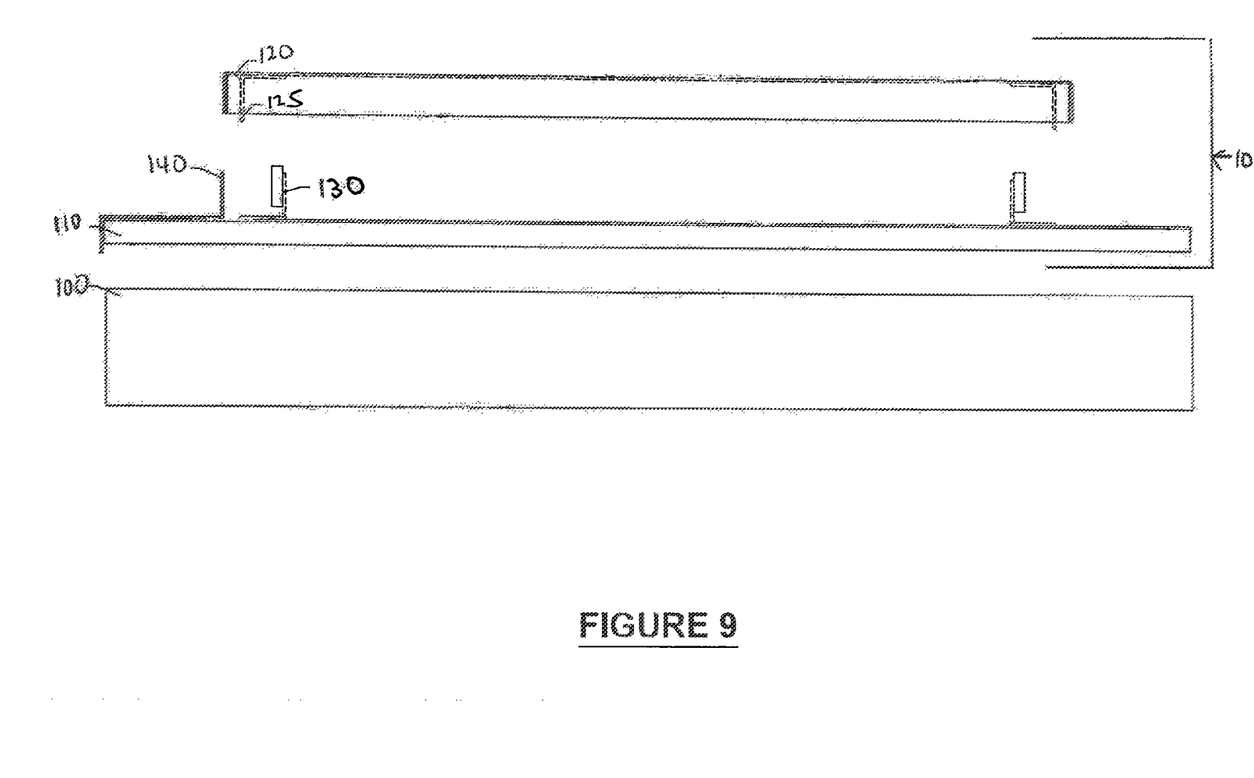
FIG. 9 is an illustrative exploded drawing showing the rotating platform (120) and the turntable bearing (130) components of one embodiment of the present invention over a pallet.

In this preferred embodiment, the detent or stop (140) shown in FIGS. 8A, 8B, and 8C is a full width piece of sheet metal bent in a right angle and hinged to the pallet cover across the front of the unit. When in the locked position (FIG. 8A), the turntable cover (120) cannot rotate in either direction due to interference with the detent. The stop may be rotated about its hinge or pivot (170) as shown in FIG. 8B. When the stop is rotated approximately 270 degrees, FIG. 8C, it no longer prevents the turntable cover from rotating. Also shown is the turntable or carousel carriage (125). In one embodiment, the stop acts as a safety device, by blocking the fork pockets of the pallet, and thus preventing the pallet from being lifted while unlocked. To lock the device, the user simply flips the "lock" back into the upright position, with the turntable positioned square to the front of the unit. FIG. 9 shows an exploded view of this embodiment of the present invention (10), the pallet (100), the pallet cover (110) with turntable bearing (130) and stop (140), the turntable or carousel carriage (125), and the turntable cover (120).

Figure 10:
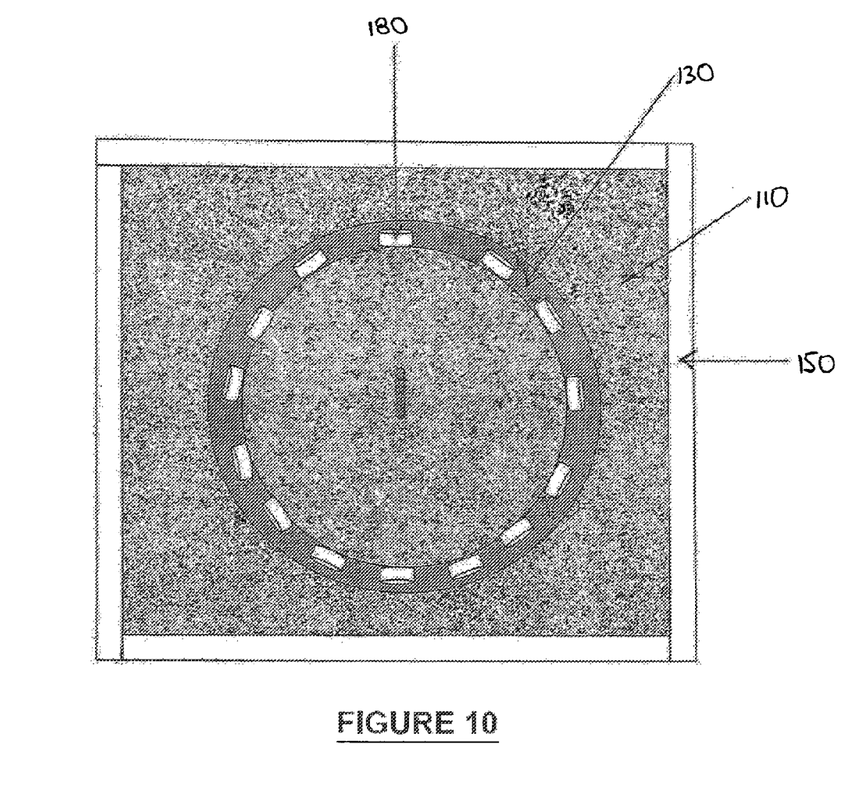
FIG. 10 is an illustrative drawing of one embodiment of the present invention showing the apparatus with the platform removed.

FIG. 10 is an illustrative drawing of one embodiment of the present invention showing the apparatus with the platform removed, wherein the bearing function is carried out by wheels (180) provided as part of a manual carousel, which is manufactured by Vestil Manufacturing Corp., 2999 North Wayne Street, Angola, Ind. 46703 and has part number Manual Carousel CA-30-2. In this embodiment the pallet measured 42 inches×48 inches and the rotating platform is 37.5 inches×37.5 inches. Of course depending on the use and articles other carousels, turntables or other rotation devices may be used. In one preferred embodiment, the pallet cover has one or more downwardly extending edges (150), and when the pallet cover is mounted on the pallet said one or more downwardly extending edges face one or more sides of the pallet.

Figure 11:
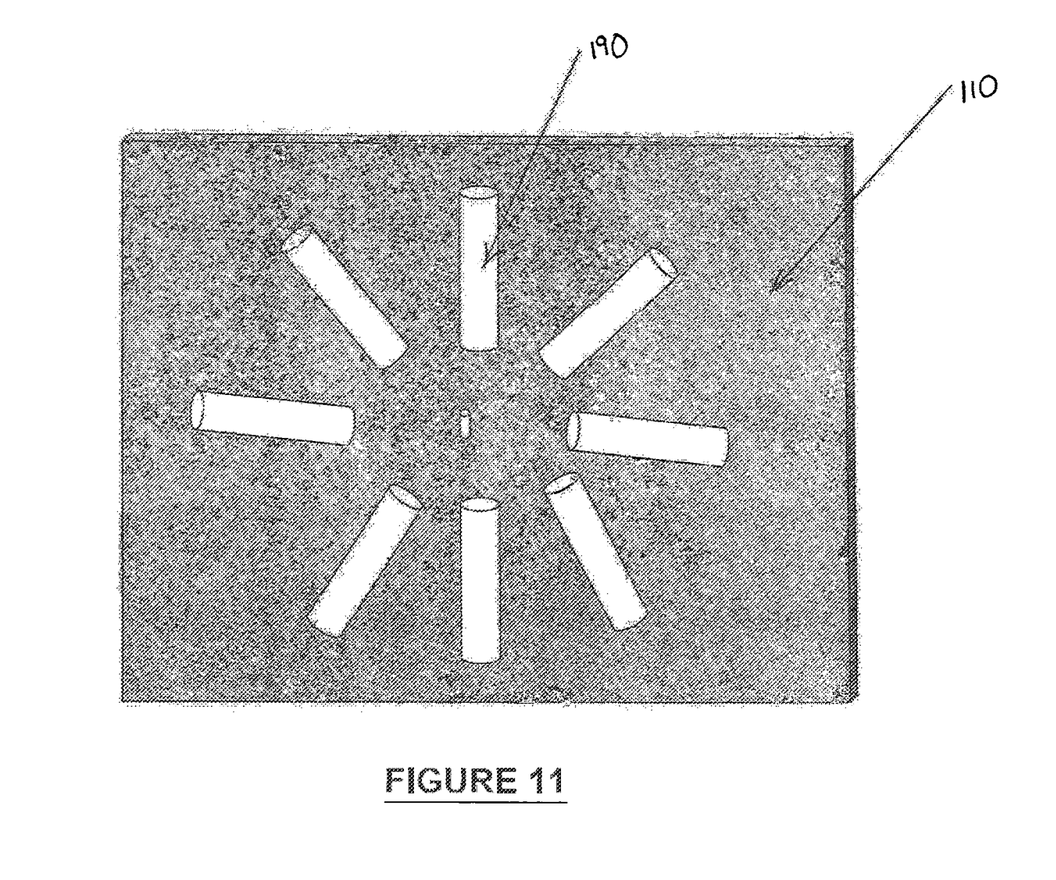
FIG. 11 is an illustrative drawing of one embodiment of the present invention showing the apparatus with the platform removed, and further showing the cylindrical rollers which provide the ability for the platform to rotate.

FIG. 11 is an illustrative drawing of one embodiment of the present invention showing the apparatus with the platform removed, wherein the bearing function is carried out by steel rollers (190) provided by Unex Manufacturing Inc., 50 Progress Place, Jackson, N.J. 08527.

Figure 12:
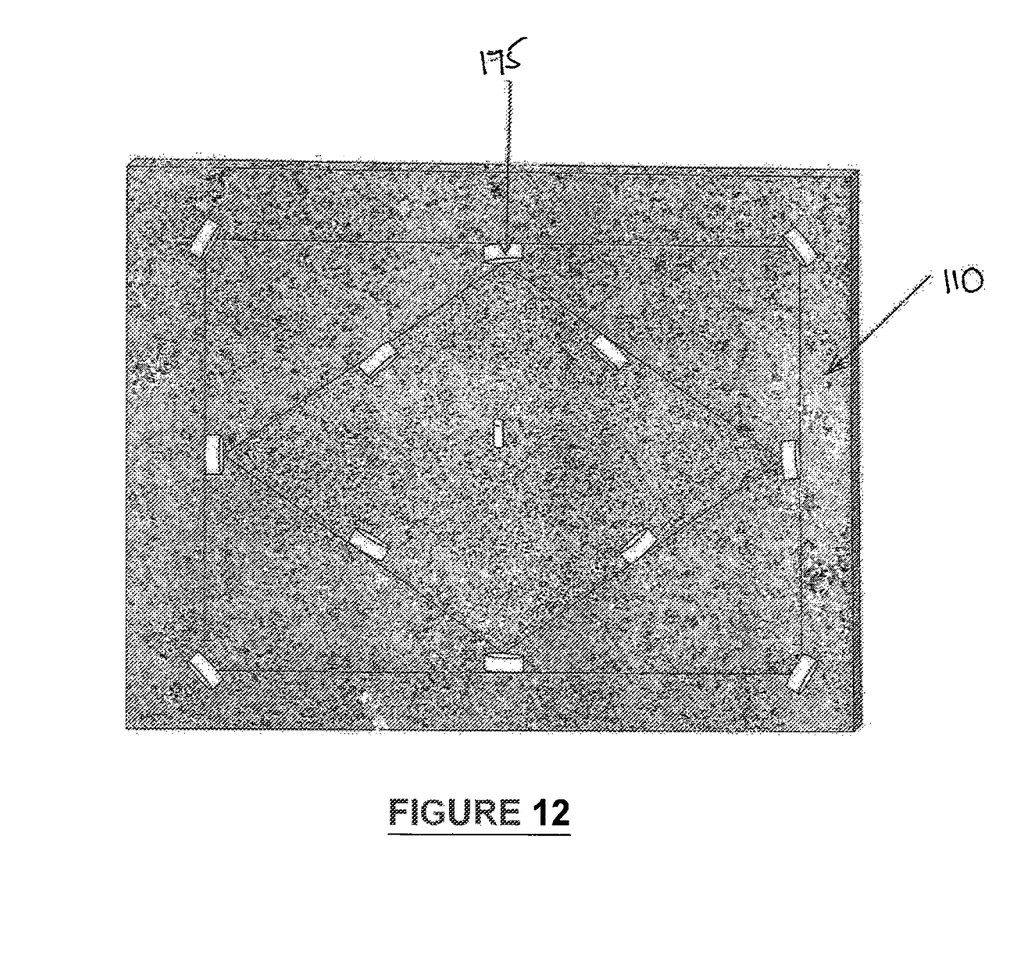
FIG. 12 is an illustrative drawing of one embodiment of the present invention showing the apparatus with the platform removed, and further showing the skate wheels which provide the ability for the platform to rotate.

FIG. 12 is an illustrative drawing of one embodiment of the present invention showing the apparatus with the platform removed, wherein the bearing function is carried out by skate wheels (175) provided by Unex Manufacturing Inc., 50 Progress Place, Jackson, N.J. 08527.

Although preferred embodiments of the present invention have been described above in detail, it is desired to emphasize that this has been for the purpose of illustrating and describing the invention, and should not be considered as necessarily limitative of the invention, it being understood that many modifications can be made by those skilled in the art while still practicing the invention claimed herein.

I claim:

1. A method for picking articles on a platform positioned over a turntable positioned over a pallet, comprising:
   picking articles located in front of a picker;
   rotating the platform; and
   picking articles which have been rotated to be in front of the picker;
   after picking the articles located in front of the picker, disengaging a detent so as to allow the platform upon which the articles are resting to rotate;
   rotating the platform;
   engaging the detent to prevent the platform from rotating; and
   picking articles which have been rotated to be in front of the picker.

2. A method for picking articles on a platform positioned over a turntable positioned over a pallet in accordance with claim 1, further comprising:
   blocking the fork pockets of the pallet while the platform is free to rotate.

3. A method for picking articles on a platform positioned over a turntable positioned over a pallet in accordance with claim 2, further comprising:

blocking the fork pockets of the pallet while the platform is free to rotate using a stop hingedly attached to a pallet cover associated with the turntable, wherein in a first position the stop prevents the turntable from rotating, and in a second position the stop blocks the fork pockets of the pallet.

4. A method for picking articles on a platform according to claim 1, wherein the turntable is a vertical axis turntable, and wherein rotating the platform further comprises rotating the platform around the vertical-axis.

5. A method for loading articles on a platform according to claim 1, wherein the turntable is a vertical axis turntable, and wherein rotating the platform further comprises rotating the platform around the vertical-axis.

6. A method for loading articles on a platform positioned over a turntable positioned over a pallet, comprising:

loading articles on the portion of the pallet located in front of a picker;
rotating the platform; and
loading articles onto the portion of the pallet which has been rotated to be in front of the picker;
after loading articles on the portion of the pallet located in front of the picker, disengaging a detent so as to allow the platform upon which the articles are resting to rotate;
rotating the platform;
engaging the detent to prevent the platform from rotating; and
then loading articles onto the portion of the pallet which has been rotated to be in front of the picker.

7. A method for loading articles on a platform positioned over a turntable positioned over a pallet in accordance with claim 6, further comprising:

blocking the fork pockets of the pallet while the platform is free to rotate.

8. A method for picking articles on a platform positioned over a turntable positioned over a pallet in accordance with claim 7, further comprising:

blocking the fork pockets of the pallet while the platform is free to rotate using a stop hingedly attached to a pallet cover associated with the turntable, wherein in a first position the stop prevents the turntable from rotating, and in a second position the stop blocks the fork pockets of the pallet.

* * * * *